United States Patent

Reddy

[11] 4,131,088
[45] Dec. 26, 1978

[54] MULTIPLE FUNCTION PRESSURE SENSOR

[75] Inventor: Junuthula N. Reddy, Troy, Mich.

[73] Assignee: The Bendix Corporation, Southfield, Mich.

[21] Appl. No.: 739,400

[22] Filed: Nov. 8, 1976

[51] Int. Cl.$^2$ .......................... F02B 3/00; G01L 9/04
[52] U.S. Cl. ........................ 123/32 EJ; 123/119 R;
73/719; 73/725; 338/4
[58] Field of Search .......... 123/32 EA, 32 EJ, 119 R;
73/398 AR, 407 R; 338/4

[56] References Cited

U.S. PATENT DOCUMENTS

| | | | |
|---|---|---|---|
| 3,013,236 | 12/1961 | Bourns | 73/398 AR |
| 3,418,854 | 12/1968 | Williams et al. | 73/407 R |
| 3,518,885 | 7/1970 | Angus | 73/407 R |
| 3,719,337 | 3/1973 | Gardner | 73/398 AR |
| 3,739,644 | 6/1973 | Underwood et al. | 73/398 AR |
| 3,949,714 | 4/1976 | Mitchell | 123/32 EA |
| 3,951,113 | 4/1976 | Wessel et al. | 123/32 EA |
| 3,956,927 | 5/1976 | Pearson | 73/398 AR |
| 3,960,120 | 6/1976 | Aono et al. | 123/119 R |
| 4,019,388 | 4/1977 | Hall et al. | 73/398 AR |

FOREIGN PATENT DOCUMENTS 2247090  4/1974  Fed. Rep. of Germany ....... 123/32 EJ Primary Examiner—Charles J. Myhre
Assistant Examiner—P. S. Lall
Attorney, Agent, or Firm—James R. Ignatowski; Russel C. Wells

[57] ABSTRACT

Disclosed herein is a multiple function pressure sensor for use in combination with an electronic fuel injection system for an internal combustion engine. The preferred embodiment has two pressure sensitive elements in a single housing which generate signals indicative of the absolute pressure in the engine's intake manifold and the absolute value of the ambient or atmospheric pressure. Included electronic circuitry subtracts the value of the engine's manifold pressure from the value of the atmospheric pressure and generates a third pressure signal indicative of the difference between the manifold pressure and atmospheric pressure. These three pressure signals are utilized in the electronic fuel injection system for computing the fuel requirements of the engine under various operating conditions.

7 Claims, 6 Drawing Figures

MULTIPLE FUNCTION PRESSURE SENSOR

BACKGROUND OF THE INVENTION

1. Field of the Invention

The invention is related to the field of pressure sensors and in particular to a multiple function pressure sensor generating signals indicative of the atmospheric pressure, a second variable pressure and a third pressure which is a function of the atmospheric pressure and the second pressure.

2. Prior Art

In operating systems such as electronic fuel control system for internal combustion engines, fuel requirement computations are often based of more than one pressure measurement. Very often these systems require inputs indicative of the pressure in the engine's air intakemanifold (MAP), the atmospheric pressure and the difference between the two. In a typical speed-density electronic fuel control system, the three measured pressures are used follows:

1. Manifold absolute pressure (MAP) is used for calculating the quantity of air being inhaled by the engine, which is determinative of the quantity of fuel to be injected into the engine under normal operating conditions.
2. Atmospheric pressure is used to generate a correcton for altitude, adjusting the quantity of injected fuel as a function of atmospherc pressure, and
3. Pressure differential between MAP and atmospheric pressure is used in the calculation of full load enrichment, under acceleration and high speed operation of the engine.

Normally these measurements are made by independent pressure sensors. Various types of pressure sensors are known in the art, such as electromagnetic pressure sensors in which the position of a magnetically permeable slug in a magnetic coil is varied as a function of pressure. The inductance of the coil as determined by the position of the slug, is indicative of the sensed pressure. Another type of pressure sensor utilizes a flexible diaphram acting as an electrode of a capacitor. Flexing of the diaphragm electrode as a function of sensed pressure changes the capacitance of the capacitor which may be used to produce a signal indicative of the sensed pressure. Another type of sensor is an aneroid sensor, in which the flexing of a diaphragm produces a mechanical motion indicative of the sensed pressure. Still another type of pressure sensor uses a strain gauge disposed along the surface of a flexible diaphragm which is strained as it is flexed by an applied pressure differential. In one form of this sensor the flexible diagphram is a silicon wafer having a strain gauge and integrated amplifier circuits diffused into the surface of the silicon wafer.

Basically, the above described sensors are single function devices capable of independently measuring any one of the desired pressure parameters. However, electronic fuel injection system of the existing types and those contemplated for the future require sensed pressure inputs of at least two of the parameters discussed above, and preferably the third measure input, also. To accommodate this requirement, it is necessary that at least two separate pressure sensors be incorporated into the control systems to provide the required input signals to the electronic fuel injection control unit.

The disclosed invention overcomes the requirement for multiple sensors, by combining two independent pressure sensing elements sensing different parameters into one housing and electronically combining the outputs of the two sensing elements to generate the third required pressure signal. This substantially reduces number and cost of the sensors required as well as reducing the complexity and cost of the system. These cost savings become significant in high volume production items, such as those produced for the automotive market.

SUMMARY OF THE INVENTION

The invention is a multiple function pressure sensor for generating at least three pressure output signals required by electronic fuel injection systems for internal combustion engines in computing the fuel requirements of the engine under various operating conditions. The disclosed sensor embodies two pressure sensor elements in a single housing, one of the sensor elements measures the pressure in the engine's air intake manifold, the other sensor element measures an alternate pressure which may be either the atmospheric pressure or the difference between the atmospheric pressure and the pressure in the engine's intake manifold and the included electronic circuitry generates a signal indicative of the unmeasured parameter.

In the preferred embodiment the two pressure sensor elements are mounted in a single housing, having a passageway communicating the pressure in the engine's intake manifold to one side of one of the two pressure sensor elements. The housing further includes an aperture exposing one side of the other pressure sensitive element to atmospheric pressure. The housing also has an enclosed chamber having a predetermined internal pressure which is applied to the opposite sides of both pressure sensor elements. The pressure sensitive elements respond to the pressure difference applied to their opposite sides and respectively generates signals indicative of the value of the absolute manifold pressure and the value of he atmospheric pressure. A difference amplifier subtracts the value of the manifold pressure from the value of the atmospheric pressure and generates a signal indicative of the difference.

One object of the invention is a multiple function pressure sensor for generating signals indicative of the absolute value of a first pressure, the value of a second pressure and the difference between the first pressure and the second pressure.

Another object of the invention is a multiple function pressure sensor which measures two pressures and electronically calculates a third pressure from the two measured pressures.

Another object of the invention is a multiple function pressure sensor having two pressure sensitive elements, one side of both pressure sensitive elements being exposed to a common predetermined pressure and the opposite sides of the pressure sensitive elements being exposed to different pressures.

Another object of the invention is a single sensor providing three pressure input signals required by an electronic fuel control system for calculating the fuel requirements of an internal combustion engine.

Still another objective is a single multifunction pressure sensor which is inexpensive and capable of replacing two or more pressure sensors in an electronic control system.

These objects and other advantages of the disclosed multiple function pressure sensor will become obvious

DETAILED DESCRIPTION OF THE PREFERRED EMBODIMENT

Figure 1:
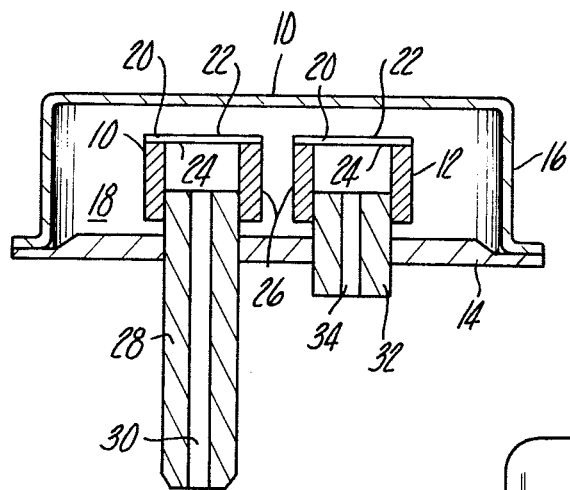
FIG. 1 is a cross sectional side view of the preferred embodiment of the disclosed multiple function pressure sensor.
Figure 2:
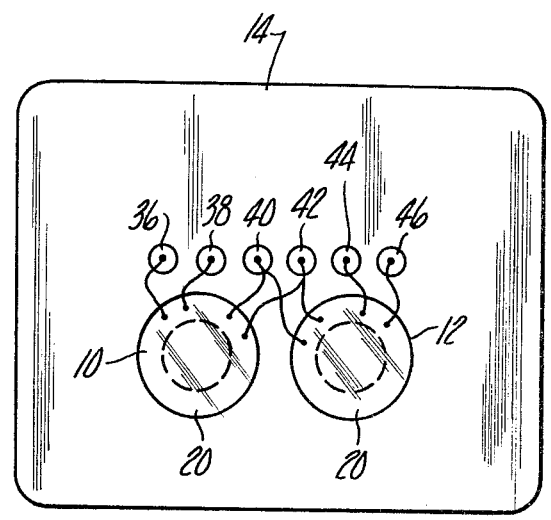
FIG. 2 is a top view of the multiple function pressure sensor illustrated in FIG. 1 with the cover removed.
Figure 3:
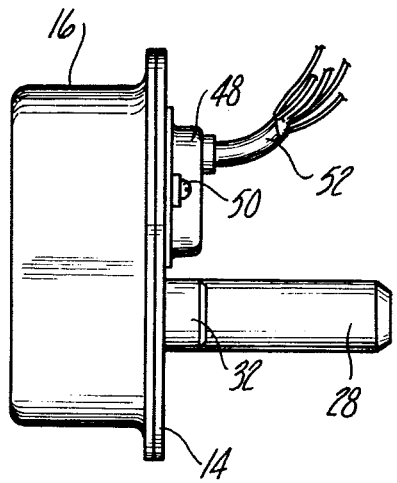
FIG. 3 is a side view of the multiple function pressure sensor illustrated in FIG. 1.
Figure 4:
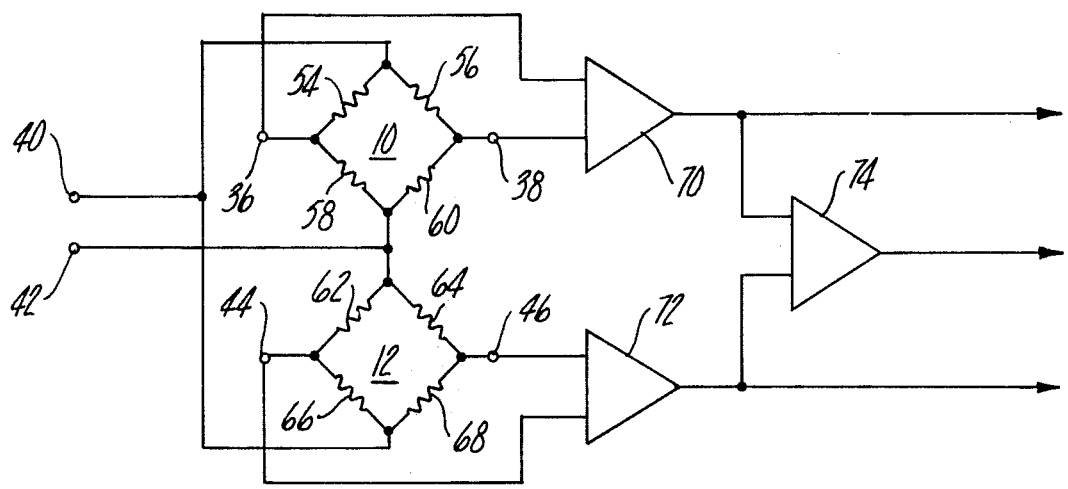
FIG. 4 is a circuit diagram of the included electronics for the preferred embodiment of FIG. 1.

The preferred embodiment of the multiple function pressure sensor is illustrated in FIGS. 1, 2 and 3. FIG. 4 is an electrical schematic of the electronic circuitry. Referring to FIG. 1, the multiple function pressure sensor comprises two pressure sensors 10 and 12 respectively supported from a base 14. The interface between the pressure sensors 10 and 12 and base 14 is vacuum sealed using techniques well known in the art, such as silver soldering or heliarc welding. A cover 16 is also sealed to the base 14 forming a vacuum chamber 18. Means, not shown, are provided for exhausting the vacuum chamber 18 to a predetermined low pressure. This means may be a copper tube attached to either the base 14 or cover 16 providing an inlet to the vacuum chamber 18. The vacuum chamber is exhausted through the copper tube and pinched off using techniques well known in the art when the pressue in the vacuum chamber stabilizes at the predetermined low pressure.

Alternatively, the base including the two pressure sensing elements sealed thereto, along with the cover are placed in a large vacuum chamber having means for mounting the cover to the base and sealing the cover to the base in a vacuum. This method eliminates the need for the copper exhaust tube discussed above.

In the preferred embodiment, the pressure inside of the vacuum chamber 18 is indicative of zero pressure relative to the lowest pressure to be measured. For a sensor which measures pressure in the range from atmospheric pressure down to 100 Torr a pressure in the vacuum chamber 18 of 10 Torr or less may be adequate, however, if the minimum pressure to be detected is 10 Torr, the pressure in the vacuum chamber 18 should be less than 0.1 Torr for an accuracy of at least 1 percent at the lower pressures.

The pressure sensors 10 and 12 have the same basic structure. Referring first to pressure sensor 10, the sensor comprises a pressure sensitive member illustrated as a thin silicon wafer 20, having resistive elements arranged in the form of an electrical bridge diffused on its upper surface 22. Strain induced in the silicon wafer due to a pressure differential applied across its opposite surfaces causes a change in resistivity of selected resistive elements diffused on the surface thereof. As is well known in the art, the resistivity of the selected diffused resistive elements is indicative of the strain in the silicon wafer, which is also a function of the pressure differential acting on the opposite surfaces of the silicon wafer. Since the pressure in vacuum chamber 18 is a constant, the output of the electrical bridge is a function of the pressure applied to the lower surface 24 of the silicon wafer.

The silicon wafer 20 is sealed to one end of a glass collar 26 having a compatible coefficient of expansion using sealing techniques well known in the art. One common method would be sealing with silver chloride, however, solder glasses commercially available from Corning Glass, of Corning, N.Y., or indum solders from Indium Corporation of America, are equally applicable sealing techniques. The glass collar 26 is sealed to a metal tube 28 also having a compatible coefficient of expansion using standard glass to metal sealing techniques. Tube 28 of pressure sensor 10 extends through the base 14, as shown. The hollow passage 30 through tube 28 serves as an inlet port to the multiple function pressure sensor from the unknown or variable pressure source to be measured.

The component parts of pressure sensor 12 are basically the same as those discussed relative to pressure sensor 10, however, the metal tube 32 is shorter and may terminate flush with the lower surface of base 14 or extend a short distance beyond the lower surface of base 14, as shown. The hollow passage 34 through the central portion of tube 32 is an atmospheric pressure inlet port and exposes the lower surface of the silicon wafer to atmospheric pressure.

FIG. 2 shows a top view of the multiple function pressure sensor 10 with the cover 16 removed. Pressure sensors 10 and 12 each have two input terminals and two output terminals connected to the electrical bridges diffused on their surfaces. The input and output terminals are connected to electrical feedthroughs 36 through 46 mounted on base 14. The input terminals to both pressure sensors are connected in common to feedthroughs 40 and 42, as shown. The two output terminals of pressure sensor 10 are connected to feedthroughs 36 and 38, respectively, and the two output terminals of pressure sensor 12 are connected to feedthroughs 44 and 46.

FIG. 3 is a side view of the multiple function pressure sensor and shows a housing 48 attached to the lower surface of base 14 using fasteners such as screws 50. A 5 lead cable 52 carries the input power to the sensor and three output signals.

FIG. 4 is an electrical schematic illustrating the resistive elements diffused on the surface of the silicon wafer 20 of pressure sensors 10 and 12, and the associated electronic circuitry. Pressure sensors 10 and 12 each have four resistive elements connected in series parallel relationship as shown, and form a conventional electrical bridge, the operation of which is well known in the art. Briefly electrical power from feedthroughs 40 and 42 is applied to opposite junctions of both electrical bridges, as shown. Two opposite resistive elements in each bridge, i.e. resistive elements 54 and 60 in pressure sensor 10 and resistive elements 62 and 68 in pressure sensor 12 are disposed to be sensitive to the strain induced in the silicon wafer and their resistance value will change as a function of the induced strain due to the pressure differential between the internal pressure and the pressure applied to the external surface. The change in the value of the two opposite resistances will cause a potential difference to be generated at the intermediate junctions, which are connected to feedthroughs 36 and 38, and 44 and 46 for pressure sensors 10 and 12, respectively. The potential difference at the intermediate junctions of pressure sensor 10 are applied to amplifier 70 which generates a signal indicative of the pressure applied to pressure sensor 10 through inlet port 30. The potential difference at the intermediate junctions of pressure sensor 12 are applied to amplifier 72, which generates a signal indicative of the ambient or atmospheric pressure applied to pressure sensor 12 through atmospheric pressure port 34. When the amplifier circuits 70 and 72 are diffused on the surfaces of the silicon wafers 20 only two feedthroughs 38 and 44 respectively would be required. A difference amplifier 74 subtracts the signal generated by amplifier 70 from the signal generated by amplifier 72 and generates a signal indicative of the difference between the ambient or atmospheric pressure and the pressure in inlet port 30.

The difference amplifier 74 may be housed in housing 48 mounted to the lower surface of base 14. However, it is understood that if the pressure in the vacuum chamber 18 is sufficiently high and the outgassing of the integrated circuit containing the difference amplifier 74 is low, the difference amplifier 74 may be mounted to the base 14 inside the vacuum chamber 18. Alternatively, the difference amplifier may be diffused on the surface of a silicon wafer having low outgassing characteristics and, therefore, be mounted inside the vacuum chamber 18 regardless of the internal pressure of the sensor.

Figure 5:
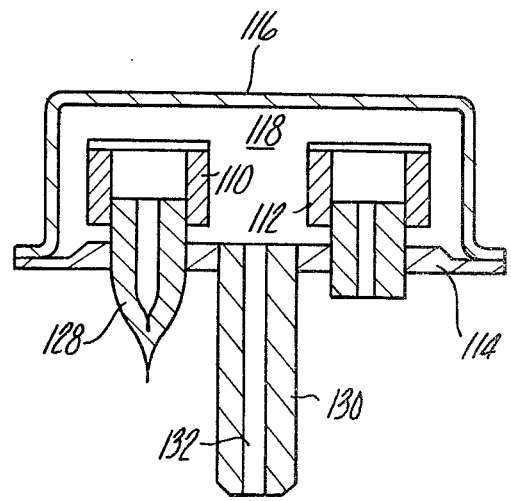
FIG. 5 is a cross-section side view of an alternate embodiment of the multiple function pressure sensor.

An alternate embodiment of the multiple function pressure sensor is illustrated on FIG. 5. The alternate embodiment also has two pressure sensors 110 and 112, which are similar to pressure sensors 10 and 12 illustrated in FIG. 1. The pressure sensors 110 and 112 are mounted to a base 114. A cover 116 is sealed to the base 114 and forms an internal chamber 118. Pressure sensor 110 comprises a silicon wafer 20, having resistive elements arranged as an electrical bridge as discussed relative to FIG. 1. The difference between pressure sensors 10 and 110 is that in place or the metal tube 28 having an end open, the metal tube 128 of pressure sensor 110 evacuated and is sealed, as shown. The internal pressure of the sealed pressure sensor 110 is indicative of zero pressure relative to the lowest pressure to be measured by the sensor. Pressure sensor 112 for all practical purposes is identical to pressure sensor 12 of FIG. 1.

In addition, the alternate embodiment includes a metal tube 130 having an internal passage 132 mounted to the base 114 providing a pressure inlet to the internal chamber 118 from the pressure source to be measured. This pressure is applied to the opposite surfaces of the silicon wafers of pressure sensors 110 and 112.

Figure 6:
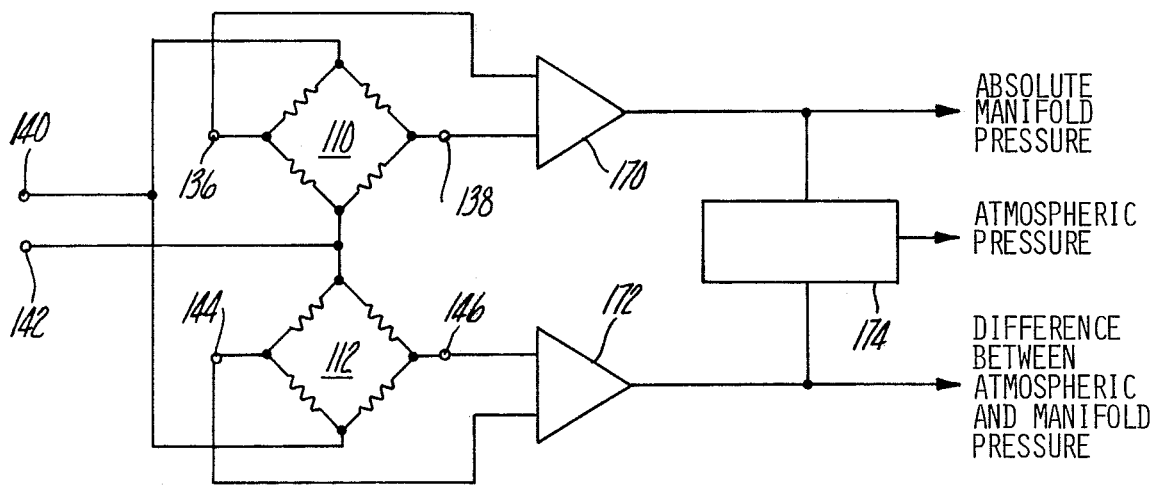
FIG. 6 is a circuit diagram of the included electronics for the alternate embodiment of FIG. 5.

An electrical schematic illustrating the resistive elements diffused on the surface of the silicon water 20 of the pressure sensors 110 and 112 and the associated circuitry are shown of FIG. 6. The strain gauges are again illustrated as an electrical bridge having four resistive elements in series parallel relationship, as previously discussed relative to FIG. 4. The strain induced in the silicon wafer of pressure sensor 110 will produce a potential difference at junctions 136 and 138. This potential difference is amplified by differential amplifier 170 to produce an electrical signal indicative of the absolute pressure in inlet port 132.

Likewise the strain induced in the silicon wafer of pressure sensor 112 will produce a potential difference at feedthroughs 144 and 146, which is amplified by differential amplifier 172 and produce an output signal indicative of the difference between the pressure in the inlet port 132 and atmospheric pressure.

The outputs of amplifier 170 and 172 are added by an adder circuit 174 generating a signal indicative of the atmospheric pressure.

Although the multiple function pressure sensor has been disclosed and described with reference to the illustrated embodiments and a particular type of pressure sensitive elements, it is recognized that alternate configurations and pressure sensitive elements may be used without departing from the spirit of the invention. For example, capacitive or aneroid type of pressure senstive elements may be interchanged for the silicon wafer strain gauges illustrated or other structural changes can be made. Further, it is recognized that in an alternate configuration the pressure sensitive elements may measure the atmospheric pressure, and the difference between the atmospheric pressure and the pressure in the inlet port and electronically generate a signal indicative of the pressure in the inlet port. It is not intended that the invention be limited to the structures illustrated and discussed herein.

What is claimed is:

1. In combination with an electronic fuel control system for an internal combustion engine having an air intake manifold, wherein said electronic fuel control system requires a first input signals indicative of the absolute value of the air pressure in the engine's air intake manifold, a second input signal indicative of the absolute value of the atmospheric pressure, and a third input signal indicative of the difference between the pressure in the engine's intake manifold and atmospheric pressure, a multi-function pressure sensor comprising first pressure sensor generating a first pressure signal, said first pressure sensor including a first pressure sensitive member and means for applying a first pressure to one side of said first pressure sensitive member;

second pressure sensor generating a second pressure signal, said second pressure means including a second pressure sensitive member and means for applying a second pressure to one side of said second pressure sensitive member;

a housing having an internal chamber, said housing supporting said first and second sensor means having the opposite sides of said first and second pressure sensitive members exposed to said internal chamber, said internal chamber communicating a third pressure to the opposite sides of said first and second pressure sensitive members; and circuit means combining the signal generated by said first pressure sensor with the signal generated by said second pressure sensor for generating a signal which is a function of said first and said second pressure signals, said circuit means outputting a signal indicative of the absolute pressure in the engine's air intake manifold, a signal indicative of atmospheric pressure and a signal indicative of the pressure difference between atmospheric pressure and the pressure in the engine's air intake manifold.

2. The combination of claim 1 wherein said first and second pressure sensors each comprises:

a substrate having opposite surfaces flexible in response to a pressure differential applied to said opposite surfaces wherein the flexing induces a detectable strain in said substrate and a strain gauge disposed along one of the opposite surfaces of said substrate generating a signal indicative of the strain induced in said substrate;

wherein the signal generated by the strain gauge of said first pressure sensor is said first pressure signal and the signal generated by the strain gauge of said second pressure sensor is said second pressure signal.

3. The combination of claim 2 wherein said substrate is a thin silicon wafer; and wherein said strain gauge is an electrical bridge circuit diffused on said one surface, said elelctrical bridge comprising at least four resistive elements disposed in series relationship in the form of a closed loop, wherein two alternate resistive elements are sensitive to the strain induced in said wafer and the two intermediate elements are insensitive to the induced strain.

4. The combination of claim 3 wherein said first pressure is the pressure in the engine's air intake manifold, said second pressure is atmospheric pressure, and said third pressure is a pressure indicative of zero pressure relative to the minimum value of said first pressure, said circuit means comprises a first amplifier generating an amplified signal indicative of the value of the pressure in the engine's air intake manifold;

a second amplifier generating an amplified signal indicative of atmospheric pressure in response to said first signal and a difference amplifier subtracting the signal indicative of the pressure in the engine's intake manifold from the signal indicative of atmospheric pressure to generate said signal indicative of the pressure difference between said atmospheric pressure and the pressure in the engine's intake manifold.

5. The combination of claim 4 wherein:

said first amplifier is an amplifier circuit diffused on said one surface of the silicon wafer of said first pressure sensor; and said second amplifier is an amplifier circuit diffused on said one surface of the silicon wafer of said second pressure sensor.

6. The combination of claim 3 wherein said first pressure sensor includes an enclosed chamber and said first pressure is a vacuum inside said enclosed chamber indicative of zero pressure, said second pressure is atmospheric pressure, and said housing includes an inlet port communicating the pressure in the engine's air intake manifold to said internal chamber said circuit means comprises:

a first amplifier generating an amplified signal indicative of the value of the pressure in the engine's air intake manifold in response to said first signal a second amplifier generating an amplified signal indicative of the difference between atmospheric pressure and the pressure inside the engine's air intake manifold in response to said second signal; and a sum amplifier adding the amplified signal indicative of the value of the pressure in the engine's air intake manifold to the signal indicative of the difference between the value of the pressure in the engine's air intake manifold and atmospheric pressure to generate a signal indicative of the value of atmospheric pressure.

7. The combination of claim 6 wherein said first amplifier is an amplifier circuit diffused on said one surface of the silicon water of said first pressure sensor; and said second amplifier is an amplifier circuit diffused on said one surface of the silicon wafer of said second pressure sensor.

* * * * *